(12) United States Patent
Hirano

(10) Patent No.: US 11,120,100 B2
(45) Date of Patent: Sep. 14, 2021

(54) INFORMATION PROCESSING DEVICE, ELECTRONIC APPARATUS, INFORMATION PROCESSING METHOD, AND PROGRAM

(71) Applicant: SONY CORPORATION, Tokyo (JP)

(72) Inventor: Takaaki Hirano, Kanagawa (JP)

(73) Assignee: SONY CORPORATION, Tokyo (JP)

(*) Notice: Subject to any disclaimer, the term of this patent is extended or adjusted under 35 U.S.C. 154(b) by 369 days.

(21) Appl. No.: 16/081,530

(22) PCT Filed: Jan. 30, 2017

(86) PCT No.: PCT/JP2017/003159
§ 371 (c)(1),
(2) Date: Aug. 31, 2018

(87) PCT Pub. No.: WO2017/154402
PCT Pub. Date: Sep. 14, 2017

(65) Prior Publication Data
US 2019/0102355 A1    Apr. 4, 2019

(30) Foreign Application Priority Data

Mar. 10, 2016  (JP) .............................. JP2016-047015

(51) Int. Cl.
*G06F 17/13* (2006.01)
*G01N 11/08* (2006.01)
(Continued)

(52) U.S. Cl.
CPC ............. *G06F 17/13* (2013.01); *G01N 11/06* (2013.01); *G01N 11/08* (2013.01); *G06F 30/23* (2020.01); *G06F 2111/10* (2020.01)

(58) Field of Classification Search
None
See application file for complete search history.

(56) References Cited

U.S. PATENT DOCUMENTS 6,405,142 B1 * 6/2002 Ogawa .................... G06F 17/13
    702/50
6,816,820 B1 * 11/2004 Friedl .................. B29C 33/3835
    703/2

(Continued)

FOREIGN PATENT DOCUMENTS

JP    H07-040406        2/1995
JP    09150443  A  *   6/1997
(Continued)

OTHER PUBLICATIONS

JP 3641882 B2 translation (Year: 2005).*

(Continued)

*Primary Examiner* — Lina M Cordero
(74) *Attorney, Agent, or Firm* — Sheridan Ross P.C.

(57) ABSTRACT

To further reduce calculation load in flow analysis of a fluid in a cavity. Provided is an information processing device including: a division unit configured to divide a cavity in which a fluid flows into a plurality of infinitesimal elements; an adjustment unit configured to adjust an equation expressing a conservation law of a physical quantity related to the fluid, on a basis of distribution of a thickness of the cavity; and an analysis unit configured to calculate flow velocity for each of the infinitesimal elements by using the equation adjusted by the adjustment unit.

20 Claims, 10 Drawing Sheets

(51) Int. Cl.
*G01N 11/06* (2006.01)
*G06F 30/23* (2020.01)
*G06F 111/10* (2020.01)

(56) References Cited

U.S. PATENT DOCUMENTS

| | | | | |
|---|---|---|---|---|
| 7,024,342 | B1* | 4/2006 | Waite | G06F 30/23 703/6 |
| 7,979,257 | B2* | 7/2011 | Yu | G06G 7/50 703/9 |
| 2006/0089803 | A1* | 4/2006 | Lei | G06F 30/23 702/1 |
| 2007/0213944 | A1* | 9/2007 | Matsuzawa | G06F 30/23 702/45 |
| 2008/0177518 | A1* | 7/2008 | Krishnamoorthy | G06F 30/20 703/9 |
| 2015/0234784 | A1* | 8/2015 | Yanagihara | G06F 30/23 703/2 |

FOREIGN PATENT DOCUMENTS

| | | |
|---|---|---|
| JP | H10-177591 | 6/1998 |
| JP | 2000-329780 | 11/2000 |
| JP | 3641882 B2 * | 4/2005 |
| JP | 2009-252099 | 10/2009 |

OTHER PUBLICATIONS

The basic equations of fluid dynamics (Year: 2005).*
JP 09150443 A translation (Year: 1996).*
Pruess, Jan & Simonett, Gieri. (2009). Analytic Solutions for the Two-phase Navier-Stokes Equations with Surface Tension and Gravity. Parabolic Problems. The Herbert Amann Festschrift. 80. 10.1007/978-3-0348-0075-4_26. (Year: 2009).*
International Search Report prepared by the Japan Patent Office dated Apr. 5, 2017, for International Application No. PCT/JP2017/003159.

* cited by examiner

FIG. 1
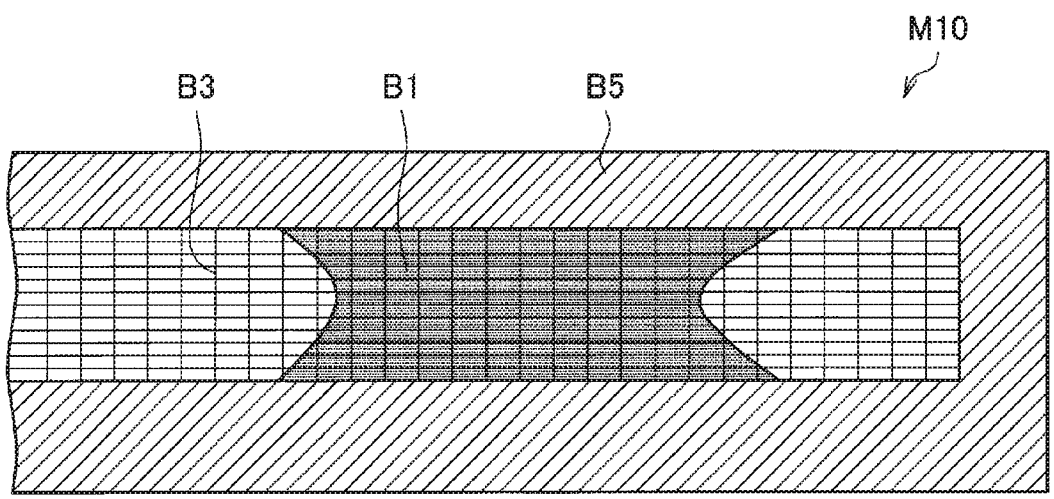
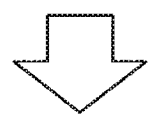
MADE TWO-DIMENSIONAL
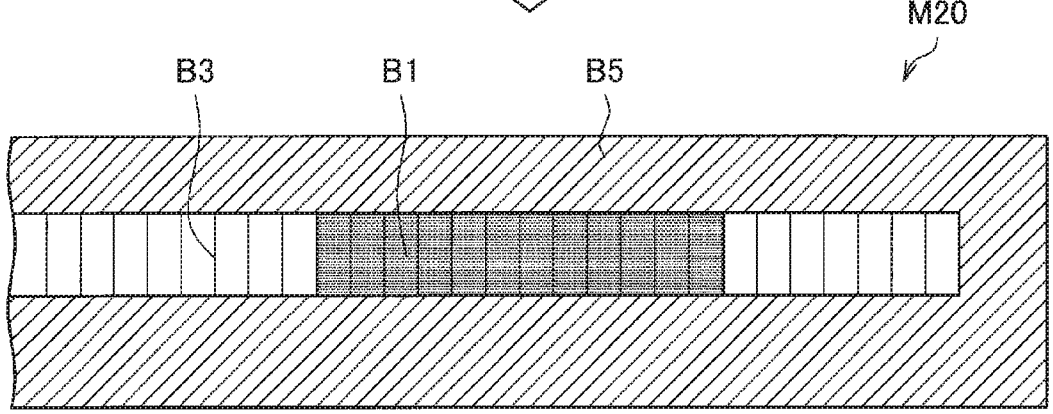

INFORMATION PROCESSING DEVICE, ELECTRONIC APPARATUS, INFORMATION PROCESSING METHOD, AND PROGRAM

CROSS REFERENCE TO RELATED APPLICATIONS

This application is a national stage application under 35 U.S.C. 371 and claims the benefit of PCT Application No. PCT/JP2017/003159 having an international filing date of 30 Jan. 2017, which designated the United States, which PCT application claimed the benefit of Japanese Patent Application No. 2016-047015 filed 10 Mar. 2016, the entire disclosures of each of which are incorporated herein by reference.

TECHNICAL FIELD

The present disclosure relates to an information processing device, an electronic apparatus, an information processing method, and a program.

BACKGROUND ART

In recent years, flow analysis regarding flow of a fluid in a cavity, typified by flow of a molten resin in injection molding, has been widely performed. In addition, technologies related to such flow analysis have been proposed.

For example, Patent Literature 1 proposes the following technology: to further facilitate thermal fluid analysis of a space surrounded by two planes, flow resistance that acts on a fluid between two parallel planes is defined as external force that acts on the fluid, the two planes are defined as free-slip walls that do not cause resistance to the fluid, and flow of the fluid and heat between the two planes is analyzed on the basis of the defined conditions.

CITATION LIST

Patent Literature

Patent Literature 1: JP 2000-329780A

DISCLOSURE OF INVENTION

Technical Problem

Incidentally, in the field related to flow analysis of a fluid, it is presumably desirable to further reduce calculation load. For example, in the case where thickness is ununiform between positions of a cavity, or the like, the cavity may need to be divided into relatively fine infinitesimal elements in an analysis model in order to ensure analysis precision. This increases the number of infinitesimal elements, which may increase calculation burden.

Hence, the present disclosure proposes a novel and improved information processing device, electronic apparatus, information processing method, and program capable of further reducing calculation load in flow analysis of a fluid in a cavity.

Solution to Problem

According to the present disclosure, there is provided an information processing device including: a division unit configured to divide a cavity in which a fluid flows into a plurality of infinitesimal elements; an adjustment unit configured to adjust an equation expressing a conservation law of a physical quantity related to the fluid, on a basis of distribution of a thickness of the cavity; and an analysis unit configured to calculate flow velocity for each of the infinitesimal elements by using the equation adjusted by the adjustment unit.

In addition, according to the present disclosure, there is provided an electronic apparatus including the information processing device.

In addition, according to the present disclosure, there is provided an information processing method including: dividing a cavity in which a fluid flows into a plurality of infinitesimal elements; adjusting, by an information processing device, an equation expressing a conservation law of a physical quantity related to the fluid, on a basis of distribution of a thickness of the cavity; and calculating flow velocity for each of the infinitesimal elements by using the adjusted equation.

In addition, according to the present disclosure, there is provided a program causing a computer to function as: a division unit configured to divide a cavity in which a fluid flows into a plurality of infinitesimal elements; an adjustment unit configured to adjust an equation expressing a conservation law of a physical quantity related to the fluid, on a basis of distribution of a thickness of the cavity; and an analysis unit configured to calculate flow velocity for each of the infinitesimal elements by using the equation adjusted by the adjustment unit.

Advantageous Effects of Invention

As described above, according to the present disclosure, calculation load can be further reduced in flow analysis of a fluid in a cavity.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is an explanatory diagram for describing an example of element division in flow analysis of a fluid in a cavity.

MODE(S) FOR CARRYING OUT THE INVENTION

Figure 2:
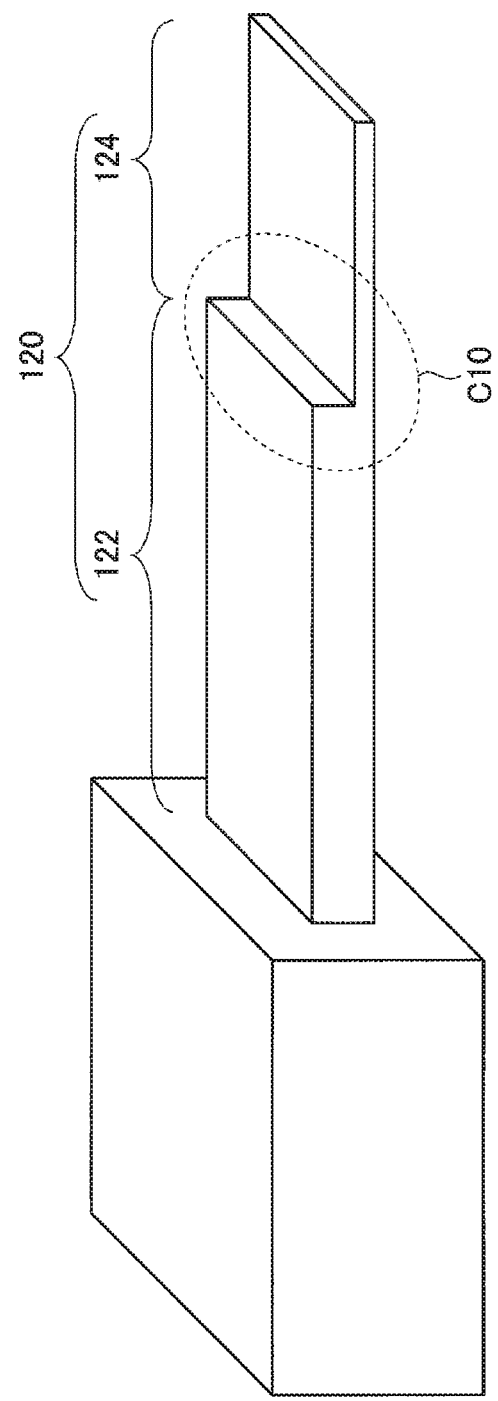
FIG. 2 is a conceptual diagram illustrating an example of a cavity to be analyzed.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description is given in the following order.
1. Introduction
2. Information processing device
2-1. Functional configuration
2-2. Adjustment of equation
3. Operation
4. Hardware configuration
5. Conclusion

1. INTRODUCTION

In flow analysis of a fluid in a cavity, it is possible to reduce the number of divisions of infinitesimal elements in order to reduce calculation load. For example, there has been proposed reducing the number of divisions in element division, which is division into infinitesimal elements, by applying a two-dimensional analysis model to a thin-walled part having a thickness that makes the influence of flow in a thickness direction of the cavity relatively small.

Specifically, Patent Literature 1 proposes omitting element division regarding the thickness direction by treating velocity distribution as a uniform one in regard to the thickness direction orthogonal to a flow direction, in a region corresponding to the thin-walled part sandwiched by two planes. Thus, as illustrated in FIG. 1, as compared with an analysis model M10 in which division into a plurality of infinitesimal elements is performed in regard to the thickness direction, the number of divisions in element division can be reduced in a two-dimensional analysis model M20 from which element division regarding the thickness direction is omitted. Note that FIG. 1 illustrates a portion B1 corresponding to the fluid, infinitesimal elements B3 obtained by dividing the cavity, and a mold B5 that forms the cavity as an internal space in each analysis model.

Figure 3:
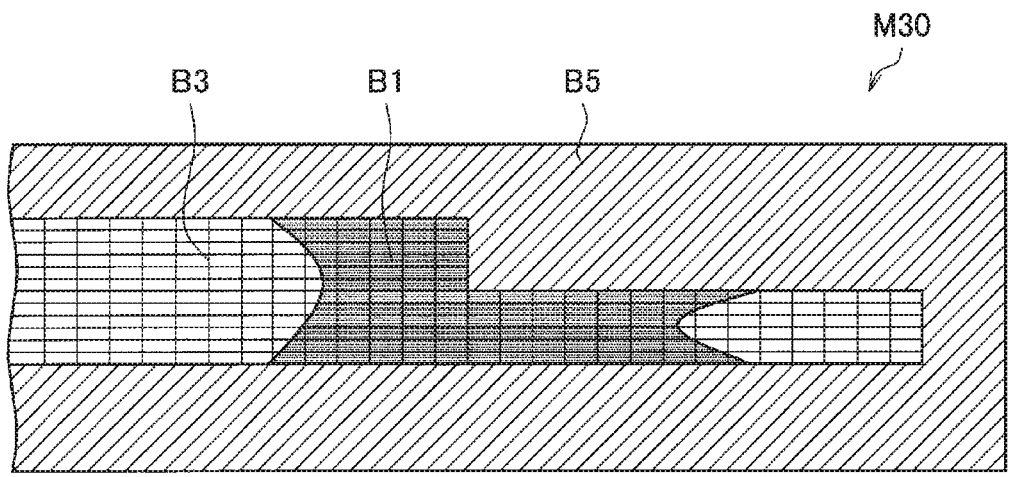
FIG. 3 is an explanatory diagram for describing an example of element division in flow analysis of a fluid in a cavity.

However, in the case where thickness is ununiform between positions of the thin-walled part of the cavity, it may be difficult to apply the two-dimensional analysis model described above. For example, as conceptually illustrated in FIG. 2, in a thin-walled part 120 of a cavity 10, a first region 122 and a second region 124 having different thicknesses from each other are provided adjacently and a step C10 is formed at the boundary between the first region 122 and the second region 124 in some cases. In such a case, near the step C10, element division into relatively fine infinitesimal elements may need to be performed in order to ensure analysis precision. Therefore, a two-dimensional analysis model is difficult to apply in some cases; hence, it is necessary to perform flow analysis using an analysis model M30 in which division into a plurality of infinitesimal elements is performed in regard to the thickness direction as illustrated in FIG. 3.

This increases the number of divisions in element division in flow analysis, which increases calculation burden in some cases. Hence, this specification proposes a mechanism capable of further reducing calculation load in flow analysis of a fluid in a cavity.

2. INFORMATION PROCESSING DEVICE

An information processing device 40 according to an embodiment of the present disclosure is described below. First, an overview of the information processing device 40 is described, and then functions of the information processing device 40 are described with reference to FIG. 4.

The information processing device 40 performs flow analysis of a fluid in a cavity, and outputs an analysis result. A fluid to be analyzed in flow analysis by the information processing device 40 may be, for example, a molten resin. Note that the fluid to be analyzed is not particularly limited, and may be a non-compressible fluid or a compressible fluid. In addition, the fluid to be analyzed may be a Newtonian fluid or a non-Newtonian fluid. The information processing device 40 performs flow analysis using input information input from an operator, for example, and causes an analysis result to be displayed to present the analysis result to the operator.

The information processing device 40 may acquire input information by, for example, receiving information input from an input device that accepts input from the operator. In that case, the input device and the information processing device 40 are configured to be able to communicate via a wired or wireless network. In addition, the information processing device 40 may be integrated with the input device. Note that the information processing device 40 may perform flow analysis using information other than input information input by the operator. For example, the information processing device 40 may perform flow analysis using information stored in a storage element of the information processing device 40 in advance.

In addition, the information processing device 40 may, for example, transmit an analysis result to a display device that displays an image to cause the display device to display the analysis result. In that case, the display device and the information processing device 40 are configured to be able to communicate via a wired or wireless network. In addition, the information processing device 40 may be integrated with the display device. Note that the information processing device 40 may present the analysis result to the operator by a method other than display of the analysis result. For example, the information processing device 40 may cause a printing device to print an analysis result to present the analysis result to the operator.

[2-1. Functional Configuration]

Figure 4:
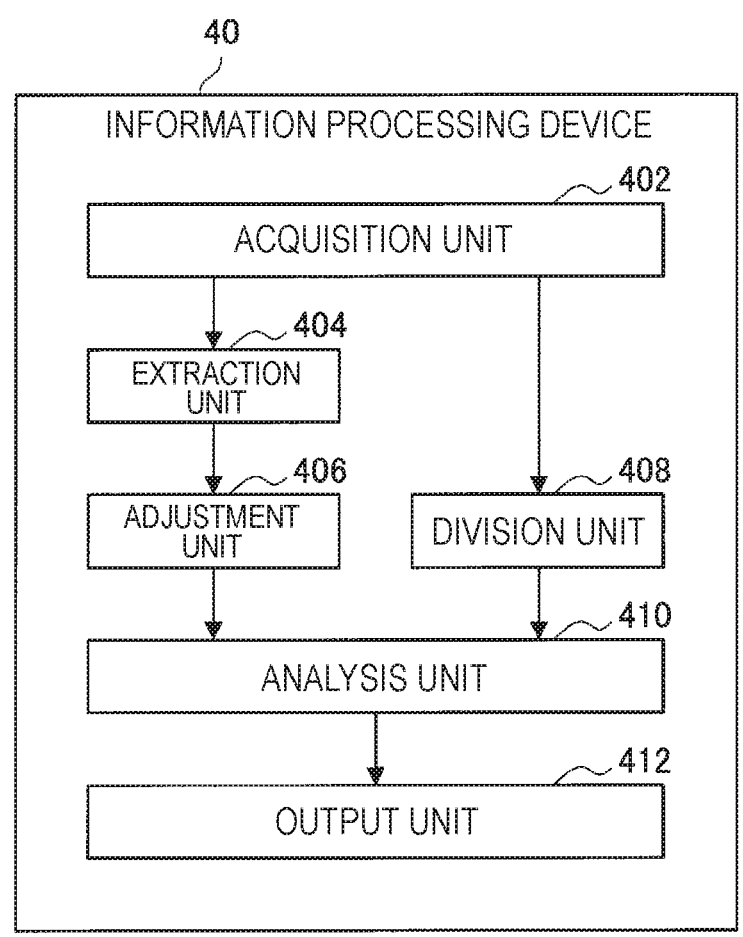
FIG. 4 is an explanatory diagram illustrating an example of a functional configuration of an information processing device according to an embodiment of the present disclosure.

Now, a functional configuration of the information processing device 40 according to the present embodiment will be described with reference to FIG. 4. FIG. 4 is an explanatory diagram illustrating an example of the functional configuration of the information processing device 40 according to the present embodiment. As illustrated in FIG. 4, the information processing device 40 includes an acquisition unit 402, an extraction unit 404, an adjustment unit 406, a division unit 408, an analysis unit 410, and an output unit 412. Note that the information processing device 40 may include a storage element, and cause the storage element to store information used in various types of processing. For example, the information processing device 40 may cause the storage element to store information such as information acquired by the acquisition unit 402, a result of extraction by the extraction unit 404, an equation before being adjusted by the adjustment unit 406, an equation having been adjusted by the adjustment unit 406, an analysis model constructed by the division unit 408, and a result of analysis by the analysis unit 410. Information stored in the storage element may be referenced as appropriate in various types of processing.

(Acquisition Unit)

The acquisition unit 402 has a function of acquiring information used for flow analysis. For example, information used for flow analysis is input by the operator. The acquisition unit 402 may acquire information used for flow analysis by receiving information transmitted from an input device that accepts input from the operator. In addition, the information processing device 40 may be integrated with the input device. In that case, the function of the acquisition unit 402 is implemented by the input device. In addition, information used for flow analysis may be stored in a storage element of the information processing device 40 in advance. In that case, the acquisition unit 402 acquires information used for flow analysis from the storage element.

Information used for flow analysis includes information regarding, for example, a shape of a cavity, a physical property value such as viscosity, density, or thermal conductivity of a fluid, and various condition values such as velocity or temperature of the fluid when the fluid flows in and flows out. The acquisition unit 402 outputs the acquired information to the extraction unit 404 and the division unit 408.

(Extraction Unit)

The extraction unit 404 acquires information indicating the shape of the cavity from the acquisition unit 402, extracts thickness distribution of the cavity on the basis of the information, and outputs an extraction result to the adjustment unit 406.

(Adjustment Unit)

The adjustment unit 406 adjusts an equation expressing a conservation law of a physical quantity related to the fluid, on the basis of the thickness distribution of the cavity. Specifically, the equation may include an equation expressing a mass conservation law of the fluid and an equation expressing a momentum conservation law of the fluid. More specifically, the equation may include an equation of continuity expressing a mass conservation law of the fluid and a Navier-Stokes equation of motion expressing a momentum conservation law of the fluid.

The adjustment unit 406 outputs information indicating the adjusted equation to the analysis unit 410. The adjusted equation is used in flow analysis by the analysis unit 410. The adjustment unit 406 adjusts the equation to make a two-dimensional analysis model applicable as an analysis model in flow analysis regarding a thin-walled part of the cavity, for example. According to the present embodiment, the adjustment of the equation by the adjustment unit 406 enables calculation load to be reduced. Note that details of the adjustment of the equation by the adjustment unit 406 will be described later.

(Division Unit)

The division unit 408 divides the cavity in which the fluid flows into a plurality of infinitesimal elements. The division unit 408 constructs an analysis model in flow analysis by dividing the cavity on the basis of information indicating the shape of the cavity. Specifically, the division unit 408 constructs a two-dimensional analysis model from which element division regarding the thickness direction is omitted, in regard to the thin-walled part of the cavity. The division unit 408 may construct a two-dimensional analysis model by using the technology proposed in Patent Literature 1, for example. The division unit 408 outputs the constructed analysis model to the analysis unit 410.

(Analysis Unit)

The analysis unit 410 performs flow analysis of the fluid in the cavity on the basis of the equation adjusted by the adjustment unit 406 and the analysis model constructed by the division unit 408, and outputs an analysis result to the output unit 412. Specifically, the analysis unit 410 calculates flow velocity for each of infinitesimal elements in the analysis model by using the equation adjusted by the adjustment unit 406. More specifically, the analysis unit 410 solves the equation for each of the infinitesimal elements to calculate flow velocity distribution in the cavity. In addition, the analysis unit 410 may further calculate pressure for each of the infinitesimal elements in the analysis model. Specifically, the analysis unit 410 solves the equation for each of the infinitesimal elements to calculate pressure distribution in the cavity.

In addition, the analysis unit 410 may analyze a flow behavior for each time of the fluid in the cavity. In this case, for example, the analysis unit 410 analyzes a flow behavior for the earliest time among times to be analyzed on the basis of the information acquired by the acquisition unit 402, and then uses a result of the analysis to analyze a flow behavior for the next time. In addition, the adjustment unit 406 may adjust the equation to be used by the analysis unit 410 to be different between the times to be analyzed. In that case, the analysis unit 410 may use different equations for the times to be analyzed.

(Output Unit)

The output unit 412 has a function of outputting a flow analysis result obtained by the analysis unit 410. The output unit 412 outputs the flow analysis result to present the analysis result to the operator. For example, the output unit 412 may transmit an analysis result to a display device that displays an image to cause the display device to display the analysis result. Thus, the analysis result is presented to the operator. In addition, the information processing device 40 may be integrated with the display device. In that case, the function of the output unit 412 is implemented by the display device.

The output unit 412 may transmit an analysis result to a printing device that performs printing to a medium to cause the printing device to print the analysis result. Thus, the analysis result is presented to the operator. In addition, the information processing device 40 may be integrated with the printing device. In that case, the function of the output unit 412 is implemented by the printing device.

Note that the output unit 412 may transmit the flow analysis result to another information processing device, and the result may be used for secondary processing by the other information processing device. In other words, the output unit 412 does not necessarily need to present the analysis result to the operator.

[2-2. Adjustment of Equation]

Now, details of the adjustment of the equation by the adjustment unit 406 will be described with reference to FIGS. 5 to 9. Hereinafter, description will be given on an example in which an equation of continuity expressing a mass conservation law of the fluid and a Navier-Stokes equation of motion expressing a momentum conservation law of the fluid are used as an equation expressing a conservation law of a physical quantity related to the fluid, which is adjusted by the adjustment unit 406. In addition, in the following description, the flow direction of the fluid is referred to as an x-axis direction, the thickness direction is referred to as a y-axis direction, and a direction orthogonal to the x axis and the y axis is referred to as a z-axis direction (hereinafter also called a depth direction).

The equation of continuity and the Navier-Stokes equations of motion regarding the x-axis direction, the y-axis direction, and the z-axis direction are expressed respectively by the following equations (3) to (6), for example.

[Math. 1]

$$\frac{\partial \rho}{\partial t} + \frac{\partial \rho u}{\partial x} + \frac{\partial \rho v}{\partial y} + \frac{\partial \rho w}{\partial z} = 0 \quad (3)$$

$$\frac{\partial \rho u}{\partial t} + \frac{\partial \rho u^2}{\partial x} + \frac{\partial \rho u v}{\partial y} + \frac{\partial \rho u w}{\partial z} = \frac{\partial \sigma_x}{\partial x} + \frac{\partial \tau_{xy}}{\partial y} + \frac{\partial \tau_{xz}}{\partial z} \quad (4)$$

$$\frac{\partial \rho v}{\partial t} + \frac{\partial \rho v u}{\partial x} + \frac{\partial \rho v^2}{\partial y} + \frac{\partial \rho v w}{\partial z} = \frac{\partial \tau_{xy}}{\partial x} + \frac{\partial \sigma_y}{\partial y} + \frac{\partial \tau_{yz}}{\partial z} \quad (5)$$

$$\frac{\partial \rho w}{\partial t} + \frac{\partial \rho w u}{\partial x} + \frac{\partial \rho w v}{\partial y} + \frac{\partial \rho w^2}{\partial z} = \frac{\partial \tau_{xz}}{\partial x} + \frac{\partial \tau_{yz}}{\partial y} + \frac{\partial \sigma_z}{\partial z} \quad (6)$$

Note that in the equations (3) to (6), ρ expresses density of the fluid, u expresses a flow velocity component in the x-axis direction, v expresses a flow velocity component in the y-axis direction, and w expresses a flow velocity component in the z-axis direction. In addition, the right side of the equations (4) to (6) corresponds to surface force that acts on a surface of a fluid body in the fluid, σx, σy, and σz express tensile stress perpendicular to a surface, and τxy, τxz, and τyz express shear stress along a surface.

Here, to simplify description, assuming that a flow behavior of the fluid in the cavity is unidirectional flow in the x-axis direction, which is the flow direction, and is described by an x coordinate, the equation of continuity and the Navier-Stokes equation of motion are expressed by the following equations (7) and (8) in regard to the flow direction.

[Math. 2]

$$\frac{\partial \rho}{\partial t} + \frac{\partial \rho u}{\partial x} = 0 \quad (7)$$

$$\frac{\partial \rho u}{\partial t} + \frac{\partial \rho u^2}{\partial x} = \frac{\partial \sigma_x}{\partial x} \quad (8)$$

Hereinafter, description will be given mainly on an example in which flow analysis is performed using the equation of continuity and the Navier-Stokes equation of motion expressed by the equations (7) and (8).

(Replacement of Space Derivative Operator)

The adjustment unit 406 may perform adjustment corresponding to addition of a term obtained by multiplying an operand in a space derivative term of an equation expressing a conservation law of a physical quantity related to the fluid by a space derivative of a thickness of the cavity and the inverse of the thickness, to the equation. For example, the adjustment unit 406 performs the adjustment corresponding to the addition by replacing the space derivative operator $$\frac{\partial}{\partial x}$$

of the equation with an operator $$\frac{D}{Dx}$$

defined by the following equation (1). Note that in the equation (1), h expresses the thickness of the cavity.

[Math. 3]

$$\frac{D}{Dx} = \frac{\partial}{\partial x} + \frac{1}{h}\left(\frac{\partial h}{\partial x}\right) \quad (1)$$

Specifically, the adjustment unit 406 replaces the space derivative operator $$\frac{\partial}{\partial x}$$

of the equation of continuity and the Navier-Stokes equation of motion with the operator $$\frac{D}{Dx}$$

defined by the equation (1).

Figure 5:
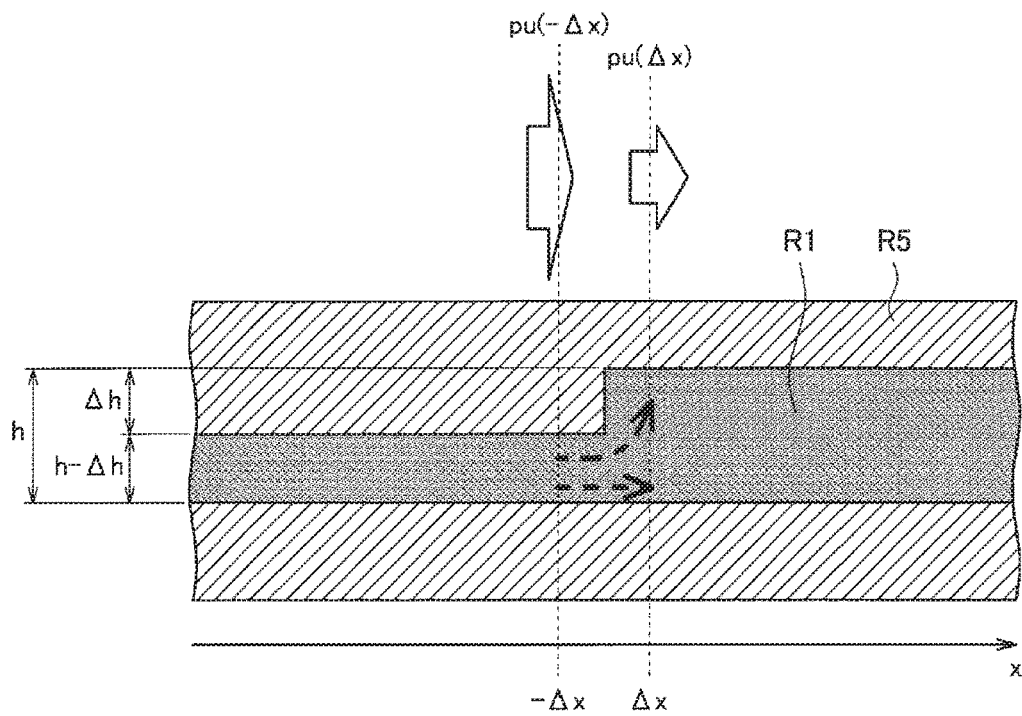
FIG. 5 is an explanatory diagram for describing an actual thickness and mass flux density at each position of a cavity.

FIG. 5 is an explanatory diagram for describing an actual thickness and mass flux density at each position of the cavity. FIG. 5 illustrates a fluid R1 in the actual cavity and an actual mold R5 that forms the cavity as an internal space. As illustrated in FIG. 5, near a step of the cavity, the thickness of the cavity is different between a position of an x coordinate "−Δx" on the upstream side with respect to the step and a position of an x coordinate "Δx" on the downstream side with respect to the step. Here, according to a mass conservation law, if a mass of a fluid in a predetermined region is assumed to be saved temporally, an inflow mass, which is a mass that flows into the predetermined region per unit time, is equal to an outflow mass, which is a mass that flows out from the predetermined region per unit time.

As illustrated in FIG. 5, in the case where mass flux density expressed by the product of flow velocity and density and the thickness of the cavity are ρu(−Δx) and h−Δh, respectively, at the position of the x coordinate "−Δx", an inflow mass regarding a region of the x coordinates "−Δx" to "Δx" is ρu(−Δx)×(h−Δh) per unit length in the depth direction. In addition, in the case where the mass flux density and the thickness of the cavity are ρu(Δx) and h, respectively, at the position of the x coordinate "Δx", an outflow mass regarding the region of the x coordinates "−Δx" to "Δx" is ρu(Δx)×h per unit length in the depth direction. Therefore, the following equation (9) holds.

[Math. 4]

$$\rho u(-\Delta x) \times (h - \Delta h) = \rho u(\Delta x) \times h \quad (9)$$

In addition, the following equation (10) is derived by arranging the equation (9).

[Math. 5]

$$\rho u(\Delta x) = \frac{(h - \Delta h)}{h} \rho u(-\Delta x) \quad (10)$$

The equation (10) indicates that the mass flux density ρu(Δx) at the position of the x coordinate "Δx" is (h−Δh)/h times the mass flux density ρu(−Δx) at the position of the x coordinate "−Δx".

Figure 6:
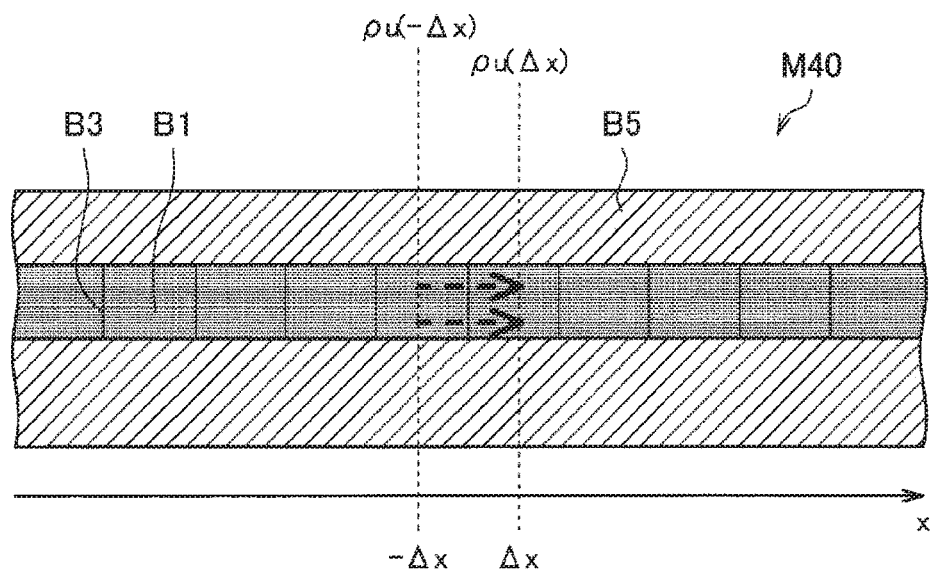
FIG. 6 is a conceptual diagram illustrating an example of an analysis model in flow analysis performed by the information processing device according to the embodiment.

As conceptually illustrated in FIG. 6, in a two-dimensional analysis model M40 constructed by the division unit 408 according to the present embodiment, element division regarding the thickness direction is omitted. Since a dimension in the thickness direction is thus omitted, in the analysis model M40, the equation of continuity and the Navier-Stokes equation of motion expressed by the equations (7) and (8), for example, are used in regard to between infinitesimal elements adjacent to each other. Here, when the equation of continuity expressed by the equation (7) before adjustment is discretized with a time derivative term set to 0 and is applied in regard to between the position of the x coordinate "−Δx" and the position of the x coordinate "Δx", the following equation (11) is derived.

[Math. 6]

$$\frac{\rho u(\Delta x) - \rho u(-\Delta x)}{2\Delta x} = 0 \quad (11)$$

In addition, the following equation (12) is derived by arranging the equation (11).

[Math. 7]

$$\rho u(\Delta x) = \rho u(-\Delta x) \quad (12)$$

Thus, the equation (12) derived using the equation of continuity expressed by the equation (7) before adjustment does not express the influence that a difference in thickness between positions of the cavity exerts on the relationship of mass flux density between the upstream side and the downstream side with respect to the step, unlike the equation (10). Therefore, in the case where flow analysis is performed by directly using the equation of continuity expressed by the equation (7) before adjustment in regard to a two-dimensional analysis model from which the dimension in the thickness direction is omitted, it may be difficult to execute calculation reflecting the influence of the thickness distribution of the actual cavity on a flow behavior.

On the other hand, when the equation of continuity after adjustment in which the space derivative operator has been replaced with the operator $$\frac{D}{Dx}$$

defined by the equation (1) is discretized and applied in regard to between the position of the x coordinate "−Δx" and the position of the x coordinate "Δx", the following equation (13) is derived.

[Math. 8]

$$\frac{\rho u(\Delta x) - \rho u(-\Delta x)}{2\Delta x} + \frac{1}{h} \frac{\Delta h}{2\Delta x} \rho u(-\Delta x) = 0 \quad (13)$$

In addition, the equation (10) is derived by arranging the equation (13). Therefore, the equation (13) derived using the equation of continuity after adjustment expresses the influence that a difference in thickness between positions of the cavity exerts on the relationship of mass flux density between the upstream side and the downstream side with respect to the step, like the equation (10).

Thus, in the case where flow analysis is performed by using the equation of continuity after the adjustment by the adjustment unit 406 in regard to a two-dimensional analysis model from which the dimension in the thickness direction is omitted, it is possible to execute calculation reflecting the influence that a difference in thickness between positions of the cavity exerts on the relationship of mass flux density between the upstream side and the downstream side with respect to the step.

In addition, according to a momentum conservation law, a difference between an inflow momentum, which is a momentum that flows into a predetermined region per unit time, and an outflow momentum, which is a momentum that flows out from the predetermined region per unit time, is equal to force that acts on the predetermined region. Hereinafter, description will be given on a case where surface force is applied as the force that acts on the predetermined region.

In the case where momentum flux density expressed by the product of mass flux density and flow velocity is $\rho u^2(-\Delta x)$ at the position of the x coordinate "−Δx" an inflow momentum in the x-axis direction regarding the region of the x coordinates "−Δx" to "Δx" is $\rho u^2(-\Delta x) \times (h-\Delta h)$ per unit length in the depth direction. In addition, in the case where the momentum flux density is $\rho u^2(\Delta x)$ at the position of the x coordinate "Δx", an outflow momentum in the x-axis direction regarding the region of the x coordinates "−Δx" to "Δx" is $\rho u^2(\Delta x) \times h$ per unit length in the depth direction.

In the case where tensile stress in the x direction at the position of the x coordinate "−Δx" is σx(−Δx), surface force in the x-axis direction that acts on a face of the region of the x coordinates "−Δx" to "Δx" on the upstream side is σx(−Δx)× (h−Δh) per unit length in the depth direction. In addition, in the case where tensile stress in the x direction at the position of the x coordinate "Δx" is σx(Δx), surface force in the x-axis direction that acts on a face of the region of the x coordinates "−Δx" to "Δx" on the upstream side is −σx (Δx)× h per unit length in the depth direction. Therefore, the following equation (14) holds.

[Math. 9]

$$\rho u^2(\Delta x) \times h - \rho u^2(-\Delta x) \times (h-\Delta h) = \sigma_x(\Delta x) \times h - \sigma_x(-\Delta x) \times (h-\Delta h) \quad (14)$$

Here, when the Navier-Stokes equation of motion expressed by the equation (8) before adjustment is discretized with a time derivative term set to 0 and is applied in regard to between the position of the x coordinate "−Δx" and the position of the x coordinate "Δx", the following equation (15) is derived.

[Math. 10]

$$\frac{\rho u^2(\Delta x) - \rho u^2(-\Delta x)}{2\Delta x} = \frac{\sigma_x(\Delta x) - \sigma_x(-\Delta x)}{2\Delta x} \tag{15}$$

Thus, the equation (15) derived using the Navier-Stokes equation of motion expressed by the equation (8) before adjustment does not express the influence that a difference in thickness between positions of the cavity exerts on the relationship of momentum flux density and surface force between the upstream side and the downstream side with respect to the step, unlike the equation (14). Therefore, in the case where flow analysis is performed by directly using the Navier-Stokes equation of motion expressed by the equation (8) before adjustment in regard to a two-dimensional analysis model from which the dimension in the thickness direction is omitted, it may be difficult to execute calculation reflecting the influence of the thickness distribution of the actual cavity on a flow behavior.

On the other hand, when the Navier-Stokes equation of motion after adjustment in which the space derivative operator has been replaced with the operator $$\frac{D}{Dx}$$

defined by the equation (1) is discretized and applied in regard to between the position of the x coordinate "−Δx" and the position of the x coordinate "Δx", the following equation (16) is derived.

[Math. 11]

$$\frac{\rho u^2(\Delta x) - \rho u^2(-\Delta x)}{2\Delta x} + \frac{1}{h}\frac{\Delta h}{2\Delta x}\rho u^2(-\Delta x) = \frac{\sigma_x(\Delta x) - \sigma_x(-\Delta x)}{2\Delta x} + \frac{1}{h}\frac{\Delta h}{2\Delta x}\sigma_x(-\Delta x) \tag{16}$$

In addition, the equation (14) is derived by arranging the equation (16). Therefore, the equation (16) derived using the Navier-Stokes equation of motion after adjustment expresses the influence that a difference in thickness between positions of the cavity exerts on the relationship of momentum flux density and surface force between the upstream side and the downstream side with respect to the step, like the equation (14).

Thus, in the case where flow analysis is performed by using the Navier-Stokes equation of motion after the adjustment by the adjustment unit 406 in regard to a two-dimensional analysis model from which the dimension in the thickness direction is omitted, it is possible to execute calculation reflecting the influence that a difference in thickness between positions of the cavity exerts on momentum flux density and surface force of the upstream side and the downstream side with respect to the step.

As described above, according to the adjustment of the equation by the adjustment unit 406 according to the present embodiment, even in the case where thickness is ununiform between positions of the thin-walled part of the cavity, it is possible to perform flow analysis using a two-dimensional analysis model from which the dimension in the thickness direction is omitted, while ensuring analysis precision. Therefore, calculation load can be further reduced in flow analysis of a fluid in the cavity.

(Decision of Term Related to Source)

The adjustment unit 406 may decide a term related to a source of the fluid, and perform adjustment of adding the term to the equation of continuity and the Navier-Stokes equation of motion to be used in flow analysis. For example, the adjustment unit 406 decides a term S corresponding to an amount of change in mass of the fluid due to the source and a term Sx corresponding to a force component in the x-axis direction applied to the fluid by the source at a position corresponding to each infinitesimal element, and adds the terms to the equations. Specifically, by the addition of the term S and the term Sx, the equation of continuity and the Navier-Stokes equation of motion expressed by the equations (7) and (8) are adjusted to equations expressed by the following equations (17) and (18).

[Math. 12]

$$\frac{\partial \rho}{\partial t} + \frac{\partial \rho u}{\partial x} = S \tag{17}$$

$$\frac{\partial \rho u}{\partial t} + \frac{\partial \rho u^2}{\partial x} = \frac{\partial \sigma_x}{\partial x} + S_x \tag{18}$$

Thus, the equation of continuity and the Navier-Stokes equation of motion to be used in flow analysis performed by the information processing device 40 may include a term related to a source of the fluid.

(Decision of Term Related to Gravity)

The adjustment unit 406 may decide a term related to gravity applied to the fluid, and perform adjustment of adding the term to the Navier-Stokes equation of motion to be used in flow analysis. For example, the adjustment unit 406 decides a term corresponding to an x-direction component of the gravity applied to the fluid, and adds the term to the Navier-Stokes equation of motion. Specifically, by the addition of the term, the Navier-Stokes equation of motion expressed by the equation (8) is adjusted to an equation expressed by the following equation (19). Note that in the equation (19), Kx expresses the x-direction component of gravitational acceleration.

[Math. 13]

$$\frac{\partial \rho u}{\partial t} + \frac{\partial \rho u^2}{\partial x} = \frac{\partial \sigma_x}{\partial x} + \rho K_x \tag{19}$$

Thus, the Navier-Stokes equation of motion to be used in flow analysis performed by the information processing device 40 may include a term related to gravity applied to the fluid. Note that the Navier-Stokes equation of motion to be used in flow analysis performed by the information processing device 40 may include mass force other than gravity applied to the fluid. The mass force is force that acts on a substance itself that supports mass or electric charge, and includes, for example, electric force or Lorentz force.

(Decision of Term Related to Flow Resistance)

The adjustment unit 406 may decide a term related to flow resistance of the fluid, and perform adjustment of adding the term to the Navier-Stokes equation of motion to be used in flow analysis. For example, the adjustment unit 406 decides a term corresponding to an x-direction component of flow resistance applied to the fluid at a position corresponding to each infinitesimal element, and adds the term to the Navier-Stokes equation of motion. Specifically, by the addition of the term, the Navier-Stokes equation of motion expressed by the equation (8) is adjusted to an equation expressed by the following equation (20). Note that in the equation (20), the term in which the square of a thickness h of the cavity is multiplied by a flow velocity u in the x-axis direction, divided by 12, and multiplied by −1 is the term corresponding to the x-direction component of flow resistance.

[Math. 14]

$$\frac{\partial \rho u}{\partial t} + \frac{\partial \rho u^2}{\partial x} = \frac{\partial \sigma_x}{\partial x} - \frac{h^2}{12}u \quad (20)$$

Thus, the Navier-Stokes equation of motion to be used in flow analysis performed by the information processing device 40 may include a term related to flow resistance of the fluid. Note that the term may be any term that corresponds to flow resistance of the fluid, and is not particularly limited to the term exemplified by the equation (20). For example, the adjustment unit 406 may decide a term corresponding to an x-direction component of flow resistance applied to the fluid at a position corresponding to each infinitesimal element, on the basis of a mathematical expression empirically obtained as a mathematical expression for calculating flow resistance.

(Decision of Surface Tension)

The adjustment unit 406 may decide a term related to surface tension of the fluid, and perform adjustment of adding the term to the Navier-Stokes equation of motion to be used in flow analysis. For example, the adjustment unit 406 decides a term corresponding to an x-direction component of surface tension applied to the fluid at a position corresponding to each infinitesimal element, and adds the term to the Navier-Stokes equation of motion. Specifically, by the addition of the term, the Navier-Stokes equation of motion expressed by the equation (8) is adjusted to an equation expressed by the following equation (21). Note that in the equation (21), Ps indicates the x-direction component of surface tension applied to the fluid, and the function f(x) indicates a function for determining whether or not a spot where a mold surface is in contact with a free surface of the fluid exists in the infinitesimal element.

[Math. 15]

$$\frac{\partial \rho u}{\partial t} + \frac{\partial \rho u^2}{\partial x} = \frac{\partial \sigma_x}{\partial x} + P_s \frac{\partial f(x)}{\partial x} \quad (21)$$

Figure 7:
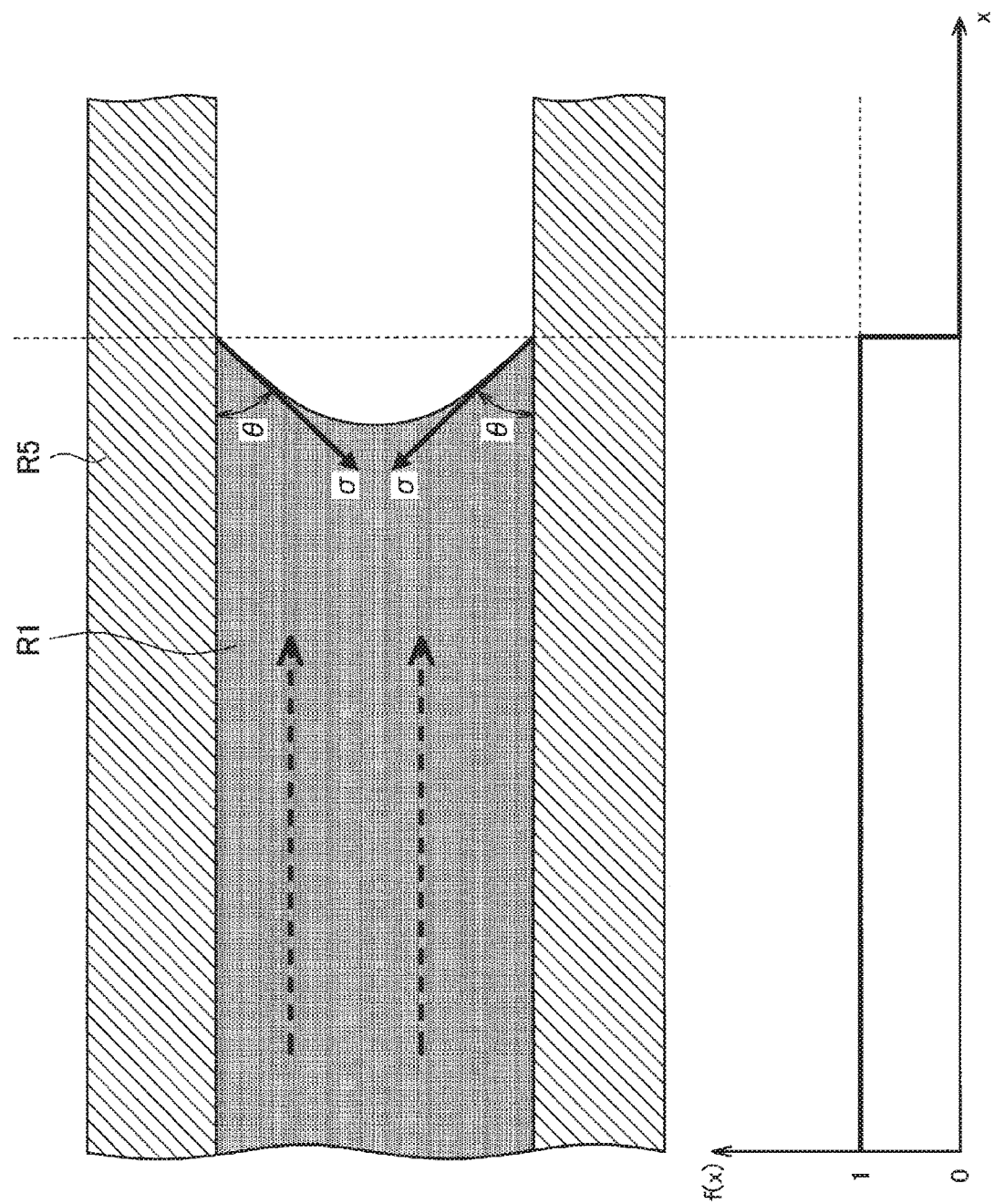
FIG. 7 is an explanatory diagram for describing surface tension applied to a fluid in a cavity.

FIG. 7 is an explanatory diagram for describing surface tension applied to the fluid in the cavity. As illustrated in FIG. 7, at an end of the fluid that has spread to wet the mold forming the cavity as a space, the free surface of the fluid may have a curved shape having a contact angle θ with respect to the mold surface. In this case, at spots where two mold surfaces that sandwich the fluid are in contact with the free surface of the fluid, surface tension occurs in directions corresponding to the contact angle θ. Therefore, the adjustment unit 406 may calculate Ps expressed by the following equation (22) as the x-direction component of surface tension applied to the fluid. Note that in the equation (22), a indicates the absolute value of surface tension per unit length applied to the fluid.

[Math. 16]

$$P_s = 2\sigma \cos \theta \quad (22)$$

In addition, as illustrated in FIG. 7, the function f(x) is a function that, for example, returns 1 at a position where the mold surface is in contact with the free surface of the fluid, and returns 0 at a position where the mold surface is not in contact with the free surface of the fluid. Therefore, according to the equation (21), Ps is multiplied by 1 in the case where a spot where the mold surface is in contact with the free surface of the fluid exists in the infinitesimal element, and Ps is multiplied by 0 in the case where a spot where the mold surface is in contact with the free surface of the fluid does not exist in the infinitesimal element.

Thus, the Navier-Stokes equation of motion to be used in flow analysis performed by the information processing device 40 may include a term related to surface tension of the fluid.

(Normalization of Term Correlated with Thickness)

The adjustment unit 406 may perform adjustment of normalizing a term correlated with a thickness of the cavity in an equation to be used in flow analysis, by multiplying the term by the inverse of the thickness of the cavity. For example, the term S related to the source of the fluid exemplified in the equation (17) is correlated with the thickness of the cavity. In addition, the term $$\frac{\partial \sigma_x}{\partial x}$$

related to surface force and the term Sx related to the source of the fluid exemplified in the equation (18) are correlated with the thickness of the cavity. The adjustment unit 406 may multiply each of such terms correlated with the thickness of the cavity by the inverse of the thickness of the cavity to normalize each of the terms. Specifically, by the normalization by the adjustment unit 406, the equation of continuity and the Navier-Stokes equation of motion expressed by the equations (17) and (18) are adjusted respectively to equations expressed by the following equations (23) and (24). Note that in the equations (23) and (24), $h_0$ indicates a thickness of an infinitesimal element in the two-dimensional analysis model constructed by the division unit 408.

[Math. 17]

$$\frac{\partial \rho}{\partial t} + \frac{\partial \rho u}{\partial x} = \frac{h_0}{h}S \quad (23)$$

$$\frac{\partial \rho u}{\partial t} + \frac{\partial \rho u^2}{\partial x} = \frac{h_0}{h}\left(\frac{\partial \sigma_x}{\partial x} + S_x\right) \quad (24)$$

Figure 8:
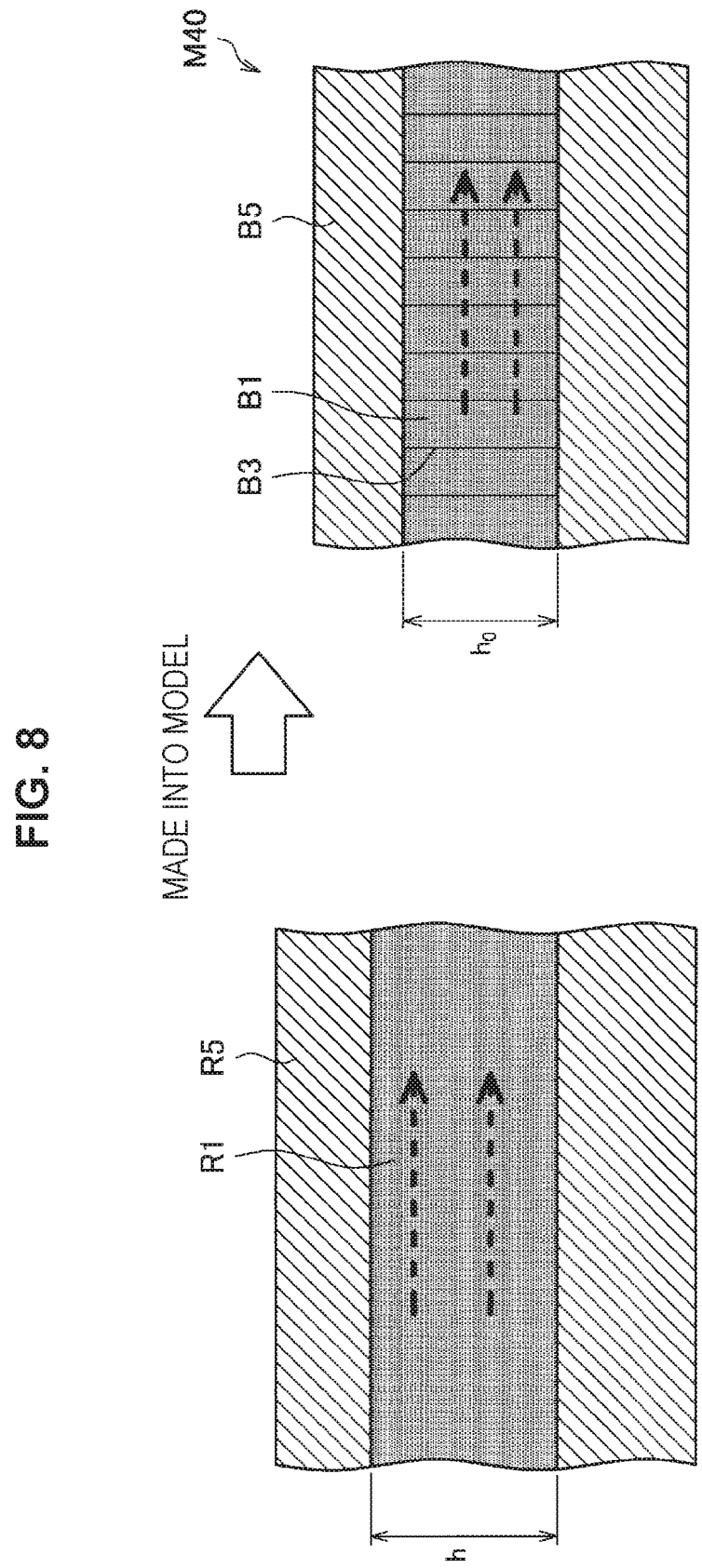
FIG. 8 is an explanatory diagram for describing a difference between an actual thickness at a predetermined position of a cavity and a thickness in an analysis model.

As described above, in the two-dimensional analysis model M40 constructed by the division unit 408, since the dimension in the thickness direction is omitted, thicknesses of the infinitesimal elements B3 are set to the same value. For example, as illustrated in FIG. 8, the thickness of the infinitesimal element B3 in the analysis model M40 is set to $h_0$ with respect to the thickness h of the actual cavity. Here, thickness is ununiform between positions of the actual cavity in some cases. On the other hand, the thickness of the infinitesimal element B3 in the analysis model M40 is set to $h_0$ regardless of the position in the cavity.

Therefore, by normalizing a term correlated with a thickness of the cavity in equations to be used in flow analysis on the basis of the thickness of the cavity, the equations can be made to comply with a two-dimensional analysis model with higher precision.

Note that the adjustment unit 406 may perform normalization in a similar manner also for the term related to flow resistance of the fluid exemplified in the equation (20) or the term related to surface tension of the fluid exemplified in the equation (21).

(Replacement of Time Derivative Operator)

The adjustment unit 406 may perform adjustment corresponding to addition of a term obtained by multiplying an operand in a time derivative term of an equation expressing a conservation law of a physical quantity related to the fluid by a time derivative of a thickness of the cavity and the inverse of the thickness, to the equation. For example, the adjustment unit 406 performs the adjustment corresponding to the addition by replacing the time derivative operator $$\frac{\partial}{\partial t}$$

of the equation with an operator $$\frac{D}{Dt}$$

defined by the following equation (2). Note that in the equation (2), h expresses the thickness of the cavity.

[Math. 18]

$$\frac{D}{Dt} + \frac{\partial}{\partial t} = \frac{1}{h}\left(\frac{\partial h}{\partial t}\right) \quad (2)$$

Specifically, the adjustment unit 406 replaces the time derivative operator $$\frac{\partial}{\partial t}$$

of the equation of continuity and the Navier-Stokes equation of motion with the operator $$\frac{D}{Dt}$$

defined by the equation (2).

Figure 9:
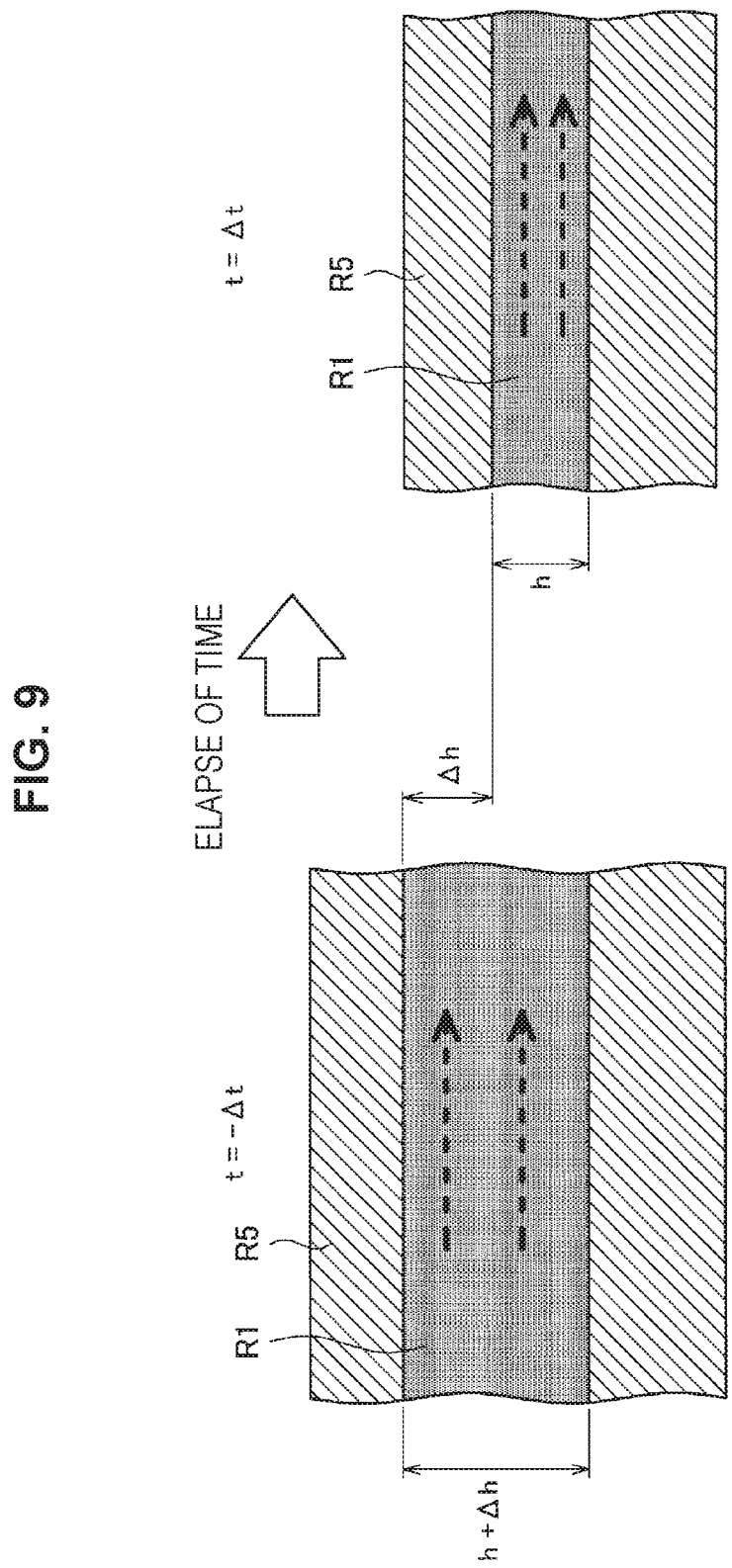
FIG. 9 is an explanatory diagram illustrating a change in thickness with time at a predetermined position of a cavity.

The thickness of the actual cavity changes with time in some cases. For example, as illustrated in FIG. 9, a thickness at a predetermined position of the cavity, which was h+Δh at a time "−Δt", may decrease to h at a time "Δt" after elapse of time. In the case where density at the time "−Δt" is ρ(−Δt), a mass of the fluid per unit area of an xy plane at the predetermined position at the time "−Δt" is ρ(−Δt)×(h+Δh). In the case where density at the time "Δt" is ρ(Δt), a mass of the fluid per unit area of an xy plane at the predetermined position at the time "Δt" is ρ(Δt)×h. Here, if a mass of a fluid in a predetermined region is assumed to be saved temporally as mentioned in the above description about replacement of the space derivative operator, the following equation (25) holds.

[Math. 19]

$$\rho(-\Delta t) \times (h+\Delta h) = \rho(\Delta t) \times h \quad (25)$$

As described above, in the two-dimensional analysis model M40 constructed by the division unit 408, the equation of continuity and the Navier-Stokes equation of motion expressed by the equations (7) and (8) are used, for example, as described above. Here, at the predetermined position of the cavity illustrated in FIG. 9, when the equation of continuity expressed by the equation (7) before adjustment is discretized with a space derivative term set to 0 and is applied in regard to between the time "−Δt" and the time "Δt", the following equation (26) is derived.

[Math. 20]

$$\frac{\rho(\Delta t) - \rho(-\Delta t)}{2\Delta t} = 0 \quad (26)$$

In addition, the following equation (27) is derived by arranging the equation (26).

[Math. 21]

$$\rho(\Delta t) = \rho(-\Delta t) \quad (27)$$

Thus, the equation (27) derived using the equation of continuity expressed by the equation (7) before adjustment does not express the influence that a temporal change in thickness of the cavity exerts on a temporal change in density of the fluid, unlike the equation (25). Therefore, in the case where flow analysis is performed by directly using the equation of continuity expressed by the equation (7) before adjustment in regard to a two-dimensional analysis model from which the dimension in the thickness direction is omitted, it may be difficult to execute calculation reflecting the influence of the temporal change in thickness of the actual cavity on a flow behavior.

On the other hand, when the equation of continuity after adjustment in which the time derivative operator has been replaced with the operator $$\frac{D}{Dt}$$

defined by the equation (2) is discretized and applied in regard to between the time "−Δt" and the time "Δt" at the predetermined position of the cavity illustrated in FIG. 9, the following equation (28) is derived.

[Math. 22]

$$\frac{\rho(\Delta t) - \rho(-\Delta t)}{2\Delta t} + \frac{1}{h}\frac{(-\Delta h)}{2\Delta t}\rho(-\Delta t) = 0 \qquad (28)$$

In addition, the equation (25) is derived by arranging the equation (28). Therefore, the equation (28) derived using the equation of continuity after adjustment expresses the influence that a temporal change in thickness of the cavity exerts on a temporal change in density of the fluid, like the equation (25).

Thus, in the case where flow analysis is performed by using the equation of continuity after the adjustment by the adjustment unit 406 in regard to a two-dimensional analysis model from which the dimension in the thickness direction is omitted, it is possible to execute calculation reflecting the influence of the temporal change in thickness of the actual cavity on a flow behavior.

The adjustment unit 406 may perform such replacement of the time derivative operator by the adjustment unit 406 similarly for the Navier-Stokes equation of motion expressed by the equation (8). Thus, in flow analysis using a two-dimensional analysis model from which the dimension in the thickness direction is omitted, applying the Navier-Stokes equation of motion after the adjustment makes it possible to execute calculation reflecting the influence of the temporal change in thickness of the actual cavity on a flow behavior.

In flow analysis using an analysis model in which division into a plurality of infinitesimal elements is performed in the thickness direction, unlike in the present embodiment, in the case where the thickness of the actual cavity changes with time, the thickness of the infinitesimal element may be changed along with the temporal change in thickness. In such a case, an aspect ratio of each infinitesimal element is excessively large, which may make it difficult to ensure analysis precision. To suppress a decrease in analysis precision accompanying an increase in aspect ratio, division into finer infinitesimal elements is performed in some cases. This may increase calculation burden.

On the other hand, in the present embodiment, even in the case where the thickness of the actual cavity changes with time, it is possible to perform flow analysis using a two-dimensional analysis model from which the dimension in the thickness direction is omitted, while keeping a constant aspect ratio and ensuring analysis precision. Therefore, calculation load can be further reduced in flow analysis of a fluid in the cavity.

3. OPERATION

Now, the sequence of various types of processing performed by the information processing device 40 according to the present embodiment will be described with reference to FIGS. 10 and 11.

Figure 10:
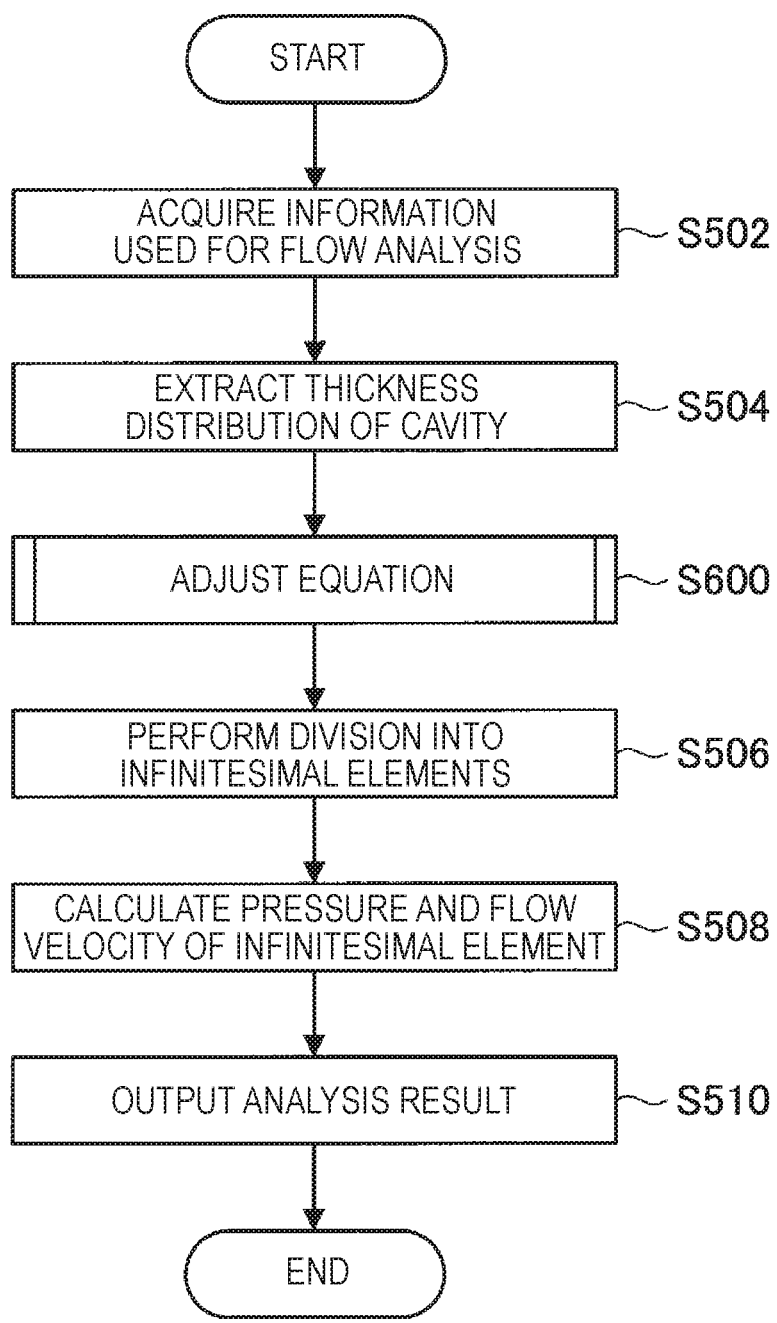
FIG. 10 is a flowchart illustrating an example of the sequence of a flow analysis process performed by the information processing device according to the embodiment.

FIG. 10 is a flowchart illustrating an example of the sequence of a flow analysis process performed by the information processing device 40 according to the present embodiment. As illustrated in FIG. 10, first, the acquisition unit 402 acquires information used for flow analysis (step S502), and outputs the information to the extraction unit 404 and the division unit 408. Next, the extraction unit 404 extracts the thickness distribution of the cavity (step S504), and outputs an extraction result to the adjustment unit 406. Then, the adjustment unit 406 adjusts an equation expressing a conservation law of a physical quantity related to the fluid, on the basis of the thickness distribution of the cavity (step S600), and outputs information indicating the adjusted equation to the analysis unit 410. Specifically, the equation is an equation of continuity expressing a mass conservation law of the fluid and a Navier-Stokes equation of motion expressing a momentum conservation law of the fluid.

Next, the division unit 408 divides the cavity in which the fluid flows into a plurality of infinitesimal elements (step S506). In addition, the division unit 408 outputs an analysis model constructed by dividing the cavity to the analysis unit 410. Then, the analysis unit 410 calculates flow velocity and pressure for each of infinitesimal elements in the analysis model by using the equation adjusted by the adjustment unit 406 (step S508), and outputs an analysis result to the output unit 412. Next, the output unit 412 outputs a flow analysis result obtained by the analysis unit 410 (step S510), and the processing illustrated in FIG. 10 ends.

Now, an equation adjustment process performed by the adjustment unit 406 (step S600 illustrated in FIG. 10) will be described in more detail with reference to FIG. 11.

Figure 11:
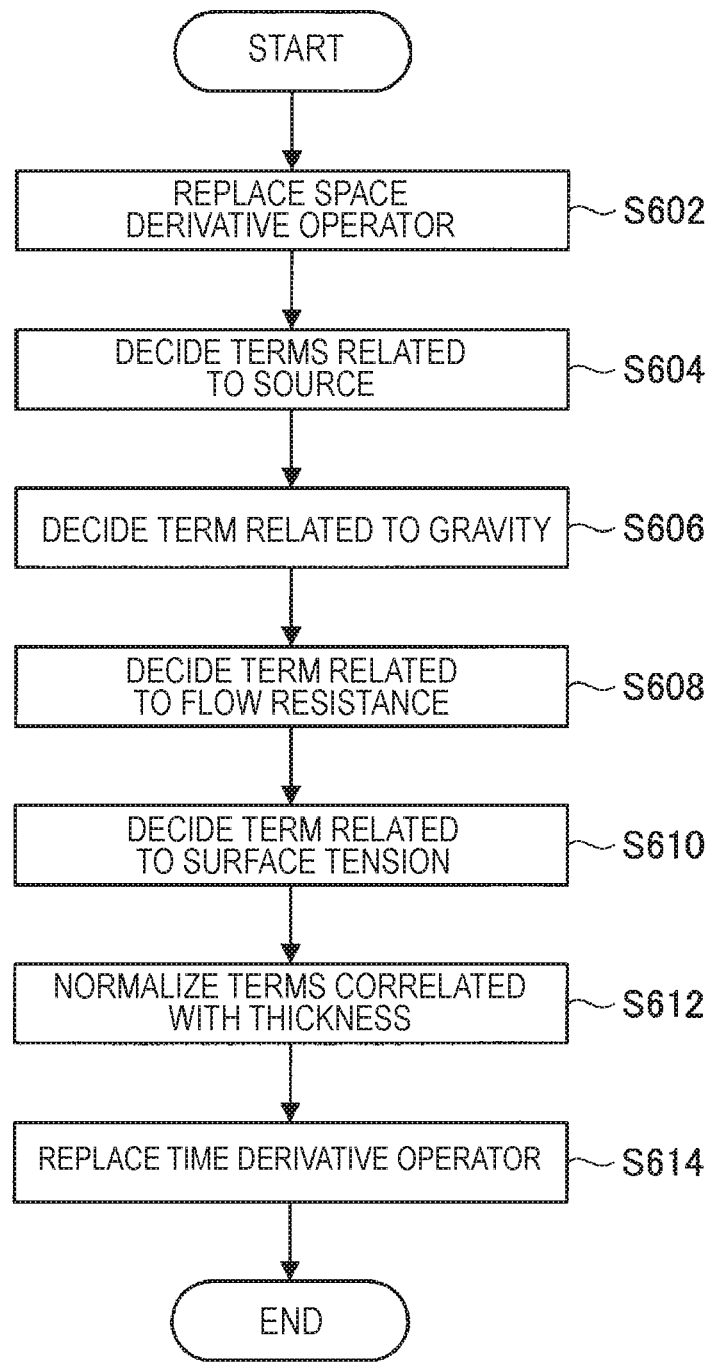
FIG. 11 is a flowchart illustrating an example of the sequence of an equation adjustment process performed by the information processing device according to the embodiment.

FIG. 11 is a flowchart illustrating an example of the sequence of an equation adjustment process performed by the adjustment unit 406 of the information processing device 40 according to the present embodiment. In the equation adjustment process, first, the adjustment unit 406 replaces the space derivative operator $$\frac{\partial}{\partial x}$$

of the equation of continuity and the Navier-Stokes equation of motion with an operator $$\frac{D}{Dx}$$

define y the equation (1) (step S602). Next, the adjustment unit 406 decides terms related to a source of the fluid (step S604), and adds the terms to the equation of continuity and the Navier-Stokes equation of motion. Next, the adjustment unit 406 decides a term related to gravity applied to the fluid (step S606), and adds the term to the Navier-Stokes equation of motion. Next, the adjustment unit 406 decides a term related to flow resistance of the fluid (step S608), and adds the term to the Navier-Stokes equation of motion. Next, the adjustment unit 406 decides a term related to surface tension of the fluid (step S610), and adds the term to the Navier-Stokes equation of motion. The adjustment unit 406 normalizes terms correlated with a thickness of the cavity in the equation of continuity and the Navier-Stokes equation of motion, by multiplying the terms by the inverse of the thickness of the cavity (step S612). Then, the adjustment unit 406 replaces the time derivative operator $$\frac{\partial}{\partial t}$$

of the equation of continuity and the Navier-Stokes equation of motion with an operator $$\frac{D}{Dt}$$

defined by the equation (2) (step S614), and the processing illustrated in FIG. 11 ends.

4. HARDWARE CONFIGURATION

The embodiment of the present disclosure has been described above. The above-described process by the information processing device 40 is realized by cooperation of software and hardware of the information processing device 40 to be described below.

Figure 12:
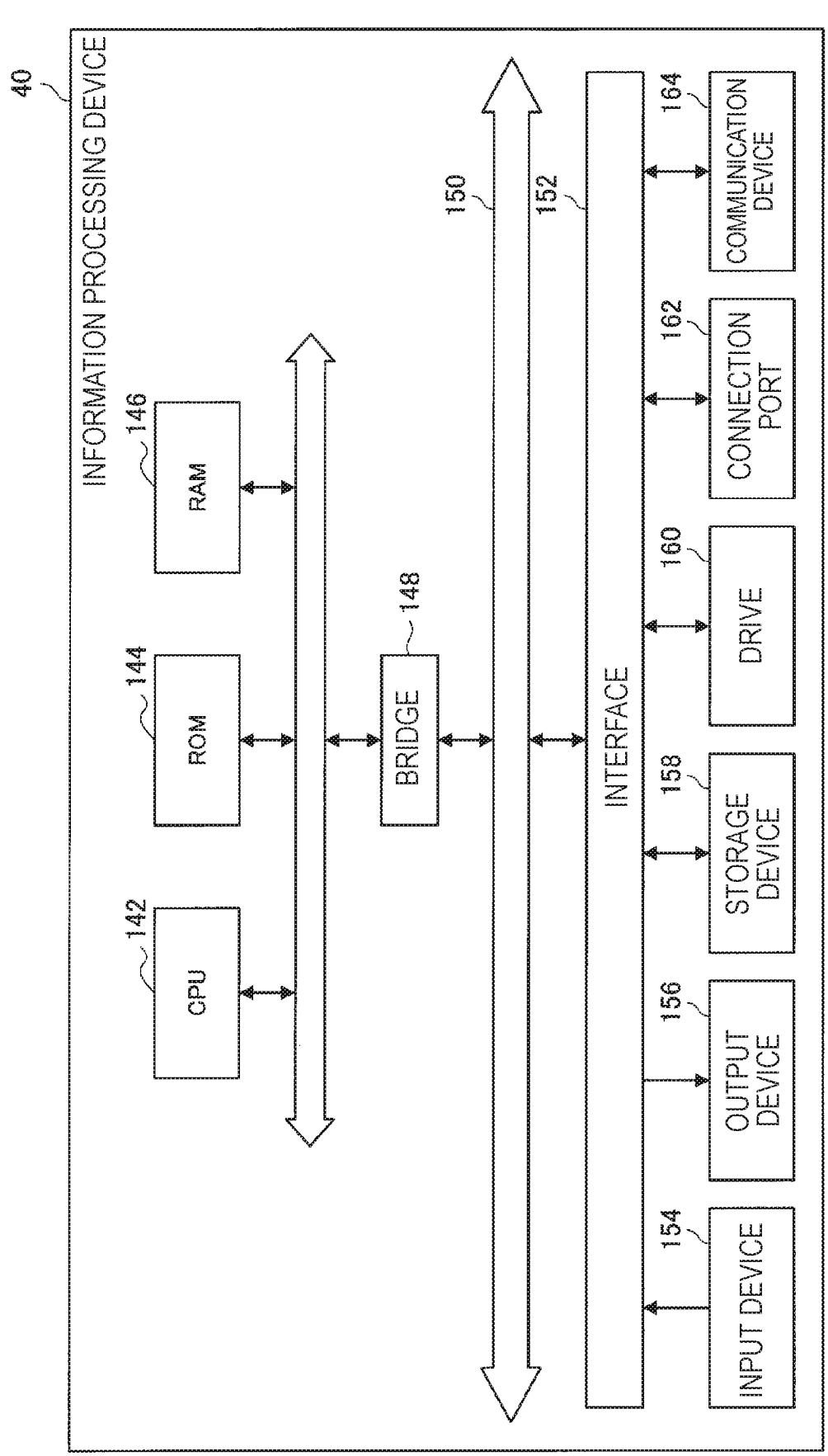
FIG. 12 is an explanatory diagram illustrating an example of a hardware configuration of an information processing device according to the present disclosure.

FIG. 12 is an explanatory diagram illustrating an example of a hardware configuration of the information processing device 40 according to the present disclosure. As illustrated in FIG. 12, the information processing device 40 includes a central processing unit (CPU) 142, a read-only memory (ROM) 144, a random access memory (RAM) 146, a bridge 148, a bus 150, an interface 152, an input device 154, an output device 156, a storage device 158, a drive 160, a connection port 162, and a communication device 164.

The CPU 142 functions as an arithmetic processing device and a control device, and realizes an operation of each functional configuration in the information processing device 40 in cooperation with various programs. Moreover, the CPU 142 may be a microprocessor. The ROM 144 stores arithmetic parameters, a program, and the like to be used by the CPU 142. The RAM 146 temporarily stores a program to be used for execution by the CPU 142 and parameters or the like appropriately changed in the execution. The CPU 142, the ROM 144, and the RAM 146 are connected to each other by an internal bus including a CPU bus.

The input device 154 is, for example, input means such as a mouse, a keyboard, a touch panel, a button, a microphone, a switch, and a lever used for an operator to input information and includes an input control circuit that generates an input signal on a basis of an input by the operator and outputs the input signal to the CPU 142. The operator of the information processing device 40 can instruct the information processing device 40 to input various kinds of data and perform a processing operation by manipulating the input device 154.

The output device 156 performs outputting to, for example, a device such as a liquid crystal display (LCD) device, an organic light-emitting diode (OLED) device, or a lamp. Further, the output device 156 may output sounds of a speaker, a headphone, and the like.

The storage device 158 is a data storage device. The storage device 158 may include a storage medium, a recording device that records data on the storage medium, a reading device that reads the data from the storage medium, and an erasure device that erases the data recorded on the storage medium. The storage device 158 stores various kinds of data or a program to be executed by the CPU 142.

The drive 160 is a storage medium reader and writer and is contained in the information processing device 40 or is externally attached. The drive 160 reads information recorded on a mounted magnetic disk, optical disc, magneto-optical disc, or removable storage medium such as a semiconductor memory and outputs the information to the RAM 144. Moreover, the drive 160 can also write information on the removable storage medium.

The connection port 162 is, for example, a bus for connection with an external information processing device or a peripheral device of the information processing device 40. Moreover, the connection port 162 may be a universal serial bus (USB).

The communication device 164 is, for example, a communication interface including a communication device for connection to a network. Moreover, the communication device 164 may be an infrared communication-compatible device, a wireless Local Area Network (LAN)-compatible communication device, a Long Term Evolution (LTE)-compatible communication device, or a wired communication device performing wired communication.

It is possible to create a computer program for realizing the aforementioned respective functions of the information processing device 40 according to the embodiment and to install the computer program on the PC or the like. The information processing device 40 according to the embodiment can correspond to the computer according to the present disclosure. In addition, it is possible to provide a computer readable recording medium in which such a computer program is stored. The recording medium is, for example, a magnetic disk, an optical disc, a magneto-optical disc, a flash memory, or the like. In addition, the above computer program may be distributed via a network, for example, without using the recording medium. Also, the respective functions of the information processing device 40 according to the embodiment may be divided by a plurality of computers, and in that case, the respective functions that the plurality of computers have can be realized by the above computer program.

5. CONCLUSION

As described above, according to the embodiment of the present disclosure, the adjustment unit 406 adjusts an equation expressing a conservation law of a physical quantity related to the fluid, on the basis of the thickness distribution of the cavity. For example, the adjustment unit 406 performs, as the adjustment based on the thickness distribution of the cavity, at least one of replacement of the space derivative operator and replacement of the time derivative operator described above. This makes it possible to perform flow analysis using a two-dimensional analysis model from which the dimension in the thickness direction is omitted, while ensuring analysis precision. Therefore, calculation load can be further reduced in flow analysis of a fluid in the cavity.

Note that the information processing device according to the embodiment described above can be applied to various electronic apparatuses. Specifically, the information processing device may be used as part of a terminal such as a personal computer or a smartphone. Alternatively, the information processing device may be used as part of industrial equipment such as an injection molding device or an inspection device in a production process. An electronic apparatus according to the present embodiment can also provide an effect similar to that of the information processing device according to the embodiment described above.

In addition, the series of control processes by each device described in the present specification may be realized using one of software, hardware, and a combination of the software and the hardware. For example, a program including the software is stored in advance on a storage medium (non-transitory media) provided internally or externally in each device. Then, for example, each program is read to the RAM at the time of execution and is executed by a processor such as the CPU. One processor or a plurality of processors may be provided to execute the respective programs.

Moreover, the process described using the flowchart in the present specification may not necessarily be performed in the order shown in the flowchart. Several processing steps may be performed in parallel. Moreover, additional processing steps may be adopted or some of the processing steps may be omitted.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a division unit configured to divide a cavity in which a fluid flows into a plurality of infinitesimal elements, an adjustment unit configured to adjust an equation expressing a conservation law of a physical quantity related to the fluid, on a basis of distribution of a thickness of the cavity; and an analysis unit configured to calculate flow velocity for each of the infinitesimal elements by using the equation adjusted by the adjustment unit.

(2)

The information processing device according to (1), in which the adjustment unit performs adjustment corresponding to addition of a term obtained by multiplying an operand in a space derivative term of the equation by a space derivative of the thickness and an inverse of the thickness, to the equation.

(3)

The information processing device according to (1) or (2), in which the adjustment unit performs adjustment corresponding to addition of a term obtained by multiplying an operand in a time derivative term of the equation by a time derivative of the thickness and an inverse of the thickness, to the equation.

(4)

The information processing device according to (2), in which the adjustment unit performs the adjustment corresponding to the addition by replacing a space derivative operator $$\frac{\partial}{\partial x}$$

of the equation with an operator $$\frac{D}{Dx}$$

defined by the following equation (1):

[Math. 23]

$$\frac{D}{Dx} = \frac{\partial}{\partial x} + \frac{1}{h}\left(\frac{\partial h}{\partial x}\right), \quad (1)$$

where h is the thickness.

(5)

The information processing device according to (3), in which the adjustment unit performs the adjustment corresponding to the addition by replacing a time derivative operator $$\frac{\partial}{\partial t}$$

of the equation with an operator $$\frac{D}{Dt}$$

defined by the following equation (2):

[Math. 24]

$$\frac{D}{Dt} = \frac{\partial}{\partial t} + \frac{1}{h}\left(\frac{\partial h}{\partial t}\right), \quad (2)$$

where h is the thickness.

(6)

The information processing device according to any one of (1) to (5), in which the equation includes an equation of continuity expressing a mass conservation law of the fluid and a Navier-Stokes equation of motion expressing a momentum conservation law of the fluid.

(7)

The information processing device according to (6), in which the equation of continuity and the Navier-Stokes equation of motion include a term related to a source of the fluid.

(8)

The information processing device according to (6) or (7), in which the Navier-Stokes equation of motion includes a term related to gravity applied to the fluid.

(9)

The information processing device according to any one of (6) to (8), in which the Navier-Stokes equation of motion includes a term related to flow resistance of the fluid.

(10)

The information processing device according to any one of (6) to (9), in which the Navier-Stokes equation of motion includes a term related to surface tension of the fluid.

(11)

The information processing device according to any one of (1) to (10), in which the adjustment unit performs adjustment of normalizing a term correlated with the thickness in the equation, by multiplying the term by an inverse of the thickness.

(12)
The information processing device according to any one of (1) to (11), in which the analysis unit calculates pressure for each of the infinitesimal elements.
(13)
An electronic apparatus including
the information processing device according to any one of (1) to (12).
(14)
An information processing method including:
dividing a cavity in which a fluid flows into a plurality of infinitesimal elements;
adjusting, by an information processing device, an equation expressing a conservation law of a physical quantity related to the fluid, on a basis of distribution of a thickness of the cavity; and
calculating flow velocity for each of the infinitesimal elements by using the adjusted equation.
(15)
A program causing a computer to function as:
a division unit configured to divide a cavity in which a fluid flows into a plurality of infinitesimal elements;
an adjustment unit configured to adjust an equation expressing a conservation law of a physical quantity related to the fluid, on a basis of distribution of a thickness of the cavity; and
an analysis unit configured to calculate flow velocity for each of the infinitesimal elements by using the equation adjusted by the adjustment unit.

REFERENCE SIGNS LIST 10 cavity
40 information processing device
120 thin-walled part
122 first region
124 second region
142 (central processing unit)
144 (read only memory)
146 (random access memory)
148 bridge
150 bus
152 interface
154 input device
156 output device
158 storage device
160 drive
162 connection port
164 communication device
402 acquisition unit
404 extraction unit
406 adjustment unit
408 division unit
410 analysis unit

What is claimed is:
1. A computing device comprising:
a processor; and
a non-transitory computer-readable storage medium storing computer-readable instructions which, when executed by the processor, cause the processor to execute a method, the method comprising:
dividing a cavity in which a fluid flows into a plurality of infinitesimal elements;
adjusting an equation expressing a conservation law of a physical quantity related to the fluid on a basis of a distribution of a thickness of the cavity, wherein:
adjusting the equation comprises addition of a term obtained by multiplying an operand in a derivative term of the equation by a derivative of the thickness of the cavity and an inverse of the thickness of the cavity,
the operand in the derivative term of the equation is in one of a space derivative term of the equation and a time derivative term of the equation, and
the derivative of the thickness of the cavity is one of a space derivative of the thickness and a time derivative of the thickness;
determining, based on the adjusted equation, a flow velocity for each of the plurality of infinitesimal elements; and
outputting the determined flow velocity for each of the plurality of infinitesimal elements.

2. The computing device according to claim 1, wherein the operand in the derivative term of the equation is in the space derivative term of the equation and the derivative of the thickness of the cavity is the space derivative of the thickness.

3. The computing device according to claim 2, wherein adjusting the equation comprises replacing a space derivative operator $$\frac{\partial}{\partial x}$$

of the equation with an operator $$\frac{D}{Dx}$$

defined by $$\frac{D}{Dx} = \frac{\partial}{\partial x} + \frac{1}{h}\left(\frac{\partial h}{\partial x}\right),$$

where h is the thickness of the cavity.

4. The computing device according to claim 1, wherein the operand in the derivative term of the equation is in the time derivative term of the equation, and the derivative of the thickness of the cavity is the time derivative of the thickness.

5. The computing device according to claim 4, wherein adjusting the equation comprises replacing a time derivative operator $$\frac{\partial}{\partial t}$$

of the equation with an operator $$\frac{D}{Dt}$$

defined by $$\frac{D}{Dt} = \frac{\partial}{\partial t} + \frac{1}{h}\left(\frac{\partial h}{\partial t}\right),$$

where t is the thickness of the cavity.

6. The computing device according to claim 1, wherein the equation includes an equation of continuity expressing a mass conservation law of the fluid and a Navier-Stokes equation of motion expressing a momentum conservation law of the fluid.

7. The computing device according to claim 6, wherein the equation of continuity and the Navier-Stokes equation of motion include a term related to a source of the fluid.

8. The computing device according to claim 6, wherein the Navier-Stokes equation of motion includes a term related to a gravity applied to the fluid.

9. The computing device according to claim 6, wherein the Navier-Stokes equation of motion includes a term related to a flow resistance of the fluid.

10. The computing device according to claim 6, wherein the Navier-Stokes equation of motion includes a term related to a surface tension of the fluid.

11. The computing device according to claim 1, wherein adjusting the equation comprises normalizing a term correlated with the thickness of the cavity in the equation by multiplying the term by the inverse of the thickness of the cavity.

12. The computing device according to claim 1, further comprising calculating a pressure for each of the plurality of infinitesimal elements.

13. An information processing method comprising:
dividing, with a processor of a computing system, a cavity in which a fluid flows into a plurality of infinitesimal elements;
adjusting, by the processor, an equation expressing a conservation law of a physical quantity related to the fluid on a basis of a distribution of a thickness of the cavity, wherein:
adjusting the equation comprises addition of a term obtained by multiplying an operand in a derivative term of the equation by a derivative of the thickness of the cavity and an inverse of the thickness of the cavity,
the operand in the derivative term of the equation is in one of a space derivative term of the equation and a time derivative term of the equation, and
the derivative of the thickness of the cavity is one of a space derivative of the thickness and a time derivative of the thickness;
determining, by the processor, based on the adjusted equation, a flow velocity for each of the plurality of infinitesimal elements; and
outputting the determined flow velocity for each of the plurality of infinitesimal elements.

14. The information processing method according to claim 13, wherein the operand in the derivative term of the equation is in the space derivative term of the equation, and the derivative of the thickness of the cavity is the space derivative of the thickness.

15. The information processing method according to claim 14, wherein adjusting the equation comprises replacing a space derivative operator $$\frac{\partial}{\partial x}$$

of the equation with an operator $$\frac{D}{Dx}$$

defined by $$\frac{D}{Dx} = \frac{\partial}{\partial x} + \frac{1}{h}\left(\frac{\partial h}{\partial x}\right),$$

where h is the thickness of the cavity.

16. The information processing method according to claim 13, wherein the operand in the derivative term of the equation is in the time derivative term of the equation, and the derivative of the thickness of the cavity is the time derivative of the thickness.

17. A computer program product comprising:
a non-transitory computer-readable storage medium having computer-readable program code embodied therewith, the computer-readable program code configured, when executed by a processor, to execute a method, the method comprising:
dividing a cavity in which a fluid flows into a plurality of infinitesimal elements;
adjusting an equation expressing a conservation law of a physical quantity related to the fluid on a basis of a distribution of a thickness of the cavity, wherein:
adjusting the equation comprises addition of a term obtained by multiplying an operand in a derivative term of the equation by a derivative of the thickness of the cavity and an inverse of the thickness of the cavity,
the operand in the derivative term of the equation is in one of a space derivative term of the equation and a time derivative term of the equation, and
the derivative of the thickness of the cavity is one of a space derivative of the thickness and a time derivative of the thickness;
determining, based on the adjusted equation, a flow velocity for each of the plurality of infinitesimal elements; and
outputting the determined flow velocity for each of the plurality of infinitesimal elements.

18. The computer program product according to claim 17, wherein the operand in the derivative term of the equation is in the space derivative term of the equation, and the derivative of the thickness of the cavity is the space derivative of the thickness.

19. The computer program product according to claim 18, wherein adjusting the equation comprises replacing a space derivative operator $$\frac{\partial}{\partial x}$$

of the equation with an operator $$\frac{D}{Dx}$$

defined by $$\frac{D}{Dx} = \frac{\partial}{\partial x} + \frac{1}{h}\left(\frac{\partial h}{\partial x}\right),$$

where h is the thickness of the cavity.

20. The computer program product according to claim 17, wherein the operand in the derivative term of the equation is in the time derivative term of the equation, and the derivative of the thickness of the cavity is the time derivative of the thickness.

* * * * *